(No Model.) 7 Sheets—Sheet 2.

R. H. LAPAGE.
BRAKE APPARATUS.

No. 360,228. Patented Mar. 29, 1887.

Witnesses
James G. Stokes
W. Cross

Inventor
R. Herbert Lapage (No Model.)

R. H. LAPAGE.
BRAKE APPARATUS.

No. 360,228.

Patented Mar. 29, 1887.

Fig. 3.

Witnesses
James G. Stokes
W. Cross

Inventor
R. Herbert Lapage (No Model.)  7 Sheets—Sheet 4.
R. H. LAPAGE.
BRAKE APPARATUS.

No. 360,228. Patented Mar. 29, 1887.

Fig. 5.

Witnesses
James H. Stokes
W. Cross

Inventor
R. Herbert Lapage (No Model.)
7 Sheets—Sheet 5.

R. H. LAPAGE.
BRAKE APPARATUS.

No. 360,228. Patented Mar. 29, 1887.

(No Model.) 7 Sheets—Sheet 6.
R. H. LAPAGE.
BRAKE APPARATUS.

No. 360,228. Patented Mar. 29, 1887.

Witnesses
James H. Stokes
W. Cross.

Inventor:
R. Herbert Lapage

N. PETERS, Photo-Lithographer, Washington, D. C.

(No Model.) 7 Sheets—Sheet 7.

R. H. LAPAGE.
BRAKE APPARATUS.

No. 360,228. Patented Mar. 29, 1887.

Witnesses
James H. Stokes.
W. Cross.

Inventor
R. Herbert Lapage

United States Patent Office.

RICHARD HERBERT LAPAGE, OF BANK CHAMBERS, NEW OXFORD STREET, COUNTY OF MIDDLESEX, ENGLAND.

BRAKE APPARATUS.

SPECIFICATION forming part of Letters Patent No. 360,228, dated March 29, 1887.

Application filed February 23, 1886. Serial No. 192,939. (No model.) Patented in England April 8, 1885, No. 4,370; in Italy March 31, 1886, XXXIX, 283; in Brazil June 12, 1886, No. 366; in India August 16, 1886, No. 54; in New Zealand October 11, 1886, No. 2,058, and in New South Wales November 23, 1886, No. 1,967.

*To all whom it may concern:*

Be it known that I, RICHARD HERBERT LAPAGE, a subject of the Queen of Great Britain and Ireland, residing at Bank Chambers, New Oxford Street, in the county of Middlesex, Kingdom of Great Britain and Ireland, have invented new and useful Improvements in and Pertaining to Brake Apparatus, (which have been patented to me as follows: Great Britain, April 8, 1885, No. 4,370; Italy, March 31, 1886, No. 283; Brazil, June 12, 1886, No. 366; India, August 16, 1886, No. 54; New Zealand, October 11, 1886, No. 2,058, and New South Wales, November 23, 1886, No. 1,967,) of which the following is a specification.

This invention has for its object to render brakes applied to railway vehicles or otherwise efficient in operation, notwithstanding frost; also, to provide for simultaneous action of such brakes, and for automatic application of the brakes in the event of coupled vehicles becoming detached. For these purposes pressure, generated in the boiler or boilers of the locomotive or locomotives used to draw the vehicle or vehicles to which the brakes are applied, (or in a separate boiler or boilers attached to the train, or both,) is applied through liquid to actuate the brakes.

The operating-liquid is water contained in a pipe or pipes extending the length of the train, and provided with flexible connections and suitable couplings between the vehicles. The fluid-pressure is caused to act differentially upon pistons or rams working in cylinders that are carried by each vehicle, and the liquid acts upon a piston or plunger or pistons or plungers in an accumulator or accumulators, which is or are in open communication with one end of each of the cylinders. The communication between the other end of each cylinder and the accumulator or accumulators and the main pipe or pipes is controlled by a valve that is normally open. The arrangement is such that when the liquid in the main pipe or pipes is subject to the boiler-pressure the differential pistons or plungers are caused to act through suitable connections upon and take off the brakes from the wheels of the vehicles, while if such pressure be removed—for instance, by exhausting a portion of the liquid from the main pipe or pipes—the valve or valves controlling the communication with one end of each cylinder will be closed, and the differential pistons or plungers will, by the action of the accumulator or accumulators, be caused to apply the brakes. By these means the brakes can be actuated simultaneously throughout a train, while should one or more vehicles become detached, either accidentally or otherwise, the pressure in the main pipe being thereby reduced, the brakes will be applied automatically.

To increase the pressure in the main or train pipes, an intensifier or intensifiers may be employed, which is or are worked, as hereinafter described, by the fluid-pressure derived from the boiler, as aforesaid.

By employing water under pressure direct from a boiler, and protecting the pipes and cylinders in which it is contained by non-conducting material, the liability of the water to freeze is obviated. Where necessary, additional heating apparatus may be applied in connection with the train-pipe to prevent freezing.

In one arrangement of apparatus according to this invention to a part of the locomotive-boiler below the water-level is attached a main pressure-pipe, which I will call the "train-pipe." It is continued to the end of the train, the connections between the vehicles being made by means of flexible pipes and couplings, and the pipe being closed at the end of the train. The flow of water into the train-pipe from the boiler is regulated by a suitable cock or valve, and a cock is also provided for the reduction of pressure from this pipe by allowing a portion of the liquid to escape into the tender or tank of the engine or other place.

On each vehicle is or are placed a cylinder or cylinders (one may be larger than the other) with suitable drain-cocks, each cylinder having a piston or ram working in it, from one side of which a piston-rod projects through a stuffing-box in the cylinder-cover. To the end of each rod pull or push rods are attached for actuating the brakes. These pistons or rams have each an effective area larger on one side than the other to the extent of the sectional area of the piston-rods connected thereto. On liquid-pressure being admitted simultaneously to both sides of each piston or ram, the pressure acting upon the larger areas will overcome and control the pressure acting on the opposite and smaller areas of the pistons, and the movement arising from this differential area is employed in assisting to keep the brake-blocks off the wheels throughout the train. The smaller areas of the pistons or rams on each vehicle are placed in direct and constant communication with the fluid-pressure, which also acts upon the ram of an accumulator fixed on the same vehicle and loaded to the required pressure by any convenient means, such as by a dead-weight or a spring the pressure of which is such that it can be lifted or moved by the lowest pressure at which the locomotive-boiler is liable to be worked. The accumulator is in connection with the train-pipe, from which water is admitted through a valve, such as will prevent the water-pressure escaping from the apparatus when the liquid is allowed to escape from the train-pipe into the tender.

The pressure or energy stored up, as described, in the separate accumulators, and acting upon the smaller areas of the pistons or rams, is employed for putting on the brakes when desired, and for automatically applying the brakes on any vehicle or portion of the train which may become detached either accidentally or designedly—as, for instance, when slipping a carriage while the train is in motion—the brakes operating immediately the liquid is partly exhausted from the train-pipe, and the pressure against the larger areas of the pistons or rams is thereby reduced.

In cases where it is desired to employ a higher pressure than that within the locomotive-boiler for working the brakes, an intensifier or intensifiers may be provided, acting upon the train-pipe for increasing and intensifying the pressure of water obtained from the boiler and for forcing it along the train-pipe to the cylinders, as above described, the rams of the accumulators in this case being properly loaded to suit the increased pressure. The intensifier (or each intensifier, when more than one is used) comprises two plungers or rams of unequal diameters, operated from the boiler by fluid-pressure. Suitable cocks or valves are employed for controlling the communications between the boiler and the intensifier and train-pipe. The couplings for connecting together the length of train-pipes may be of the kind described in the specification of my application for a United States Patent, Serial No. 212,013, filed August 27, 1886, it being a division of this present application. These couplings, which are not claimed under my present application, and of which there may be two to each end of a vehicle, are formed with socket and spigot ends, provided with cup-leathers or other suitable packing.

Cocks or valves are provided to control the passage through the ends of the flexible connecting-pipes, and each cock has secured thereto a coupling hook, rod, bar, or lever, which, when the connection is made, opens direct communication through the connecting-pipes, while when the connection is broken the communication is closed. The coupling rods, bars, or levers are arranged to pull out should one vehicle be detached from another accidentally, thus obviating breakage of connecting-pipes. Other suitable forms of coupling may, however, be employed.

To prevent the heated liquid in the train-pipe damaging the flexible connections between the vehicles, the temperature may be reduced, if necessary, by passing the pipe through a coil placed in a water-tank—as, for instance, in the tender.

Referring to the drawings hereunto annexed.

The brakes are put on by applying liquid-pressure to the pistons 1, which actuate the brake-blocks 2 through the intervention of the rods and levers 3 4 5, causing the blocks to firmly grip the wheels, thus retarding the motion of the vehicle or train of vehicles. The train-pipe 6 contains the actuating-liquid under pressure. The pressure is stored in the accumulator, which consists of the chamber 7, containing liquid maintained under pressure by the ram 8, which is acted upon by a spring, 9, suspended by rods 10. Adjustable stops 11 are placed under the spring, and by their means the stroke of the ram 8 can be regulated and a suitable pressure be obtained on the brake-blocks upon application of the brake. The chamber 7 of the accumulator communicates freely with the outer or "on" side of each piston, 1, by means of passages 12, and is connected with the train-pipe 6 by the passage 13, which is controlled by the valve 14, which may be closed, if necessary, by means of the screw 15, should it be required to shut off the accumulator. The said valve is normally open, but closes immediately the pressure in the train-pipe is reduced to a lower pressure than is maintained in the accumulator. The pressure may be released from the accumulator, and consequently from the on side of the piston by opening suitably-arranged cocks 16.

Figure 1:
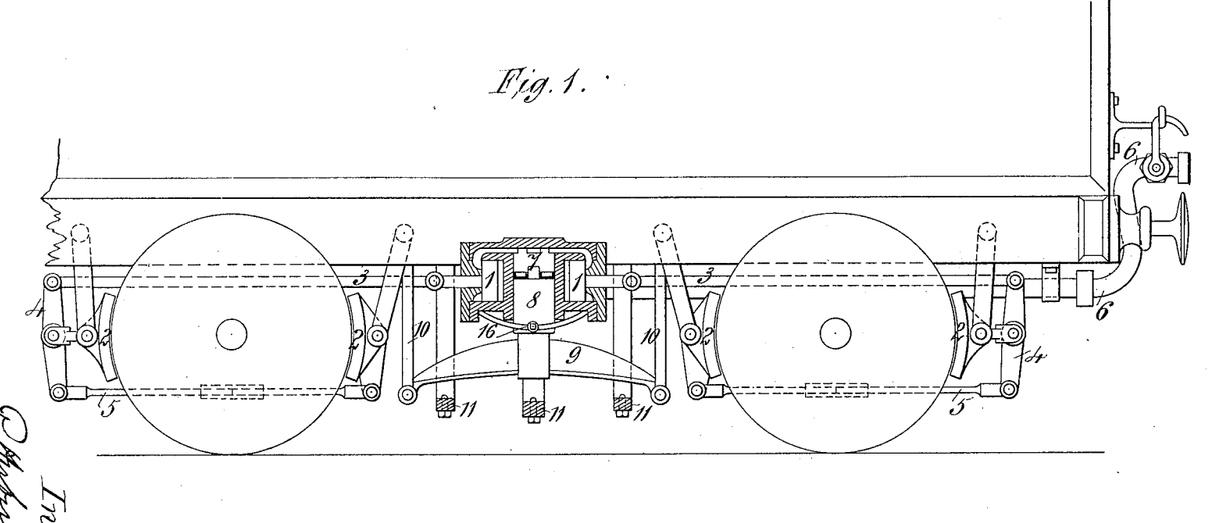
Figure 1 shows a general arrangement of cylinders with pistons and accumulator, train-pipe with connections, and brake-rigging according to my invention as applied to a four-wheeled vehicle.
Figure 2:
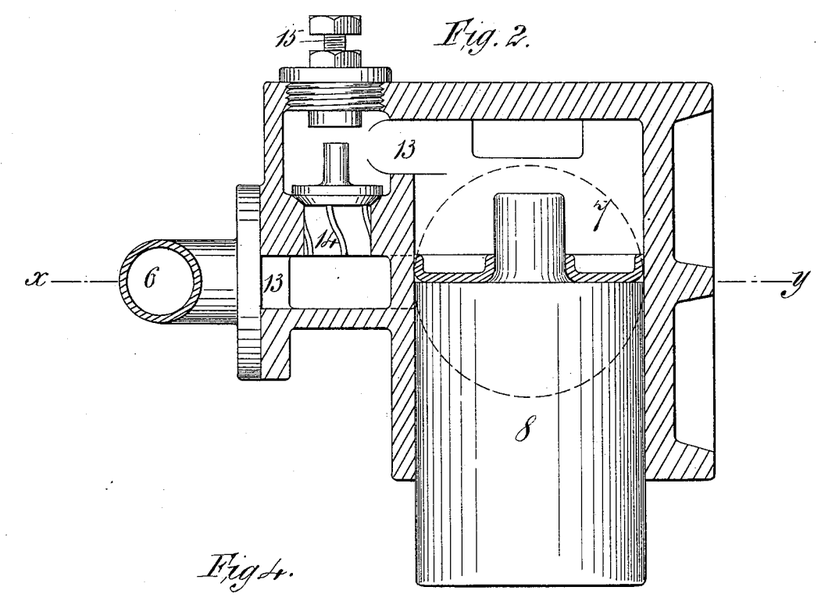
Fig. 2 is a transverse section through the accumulator.
Figure 3:
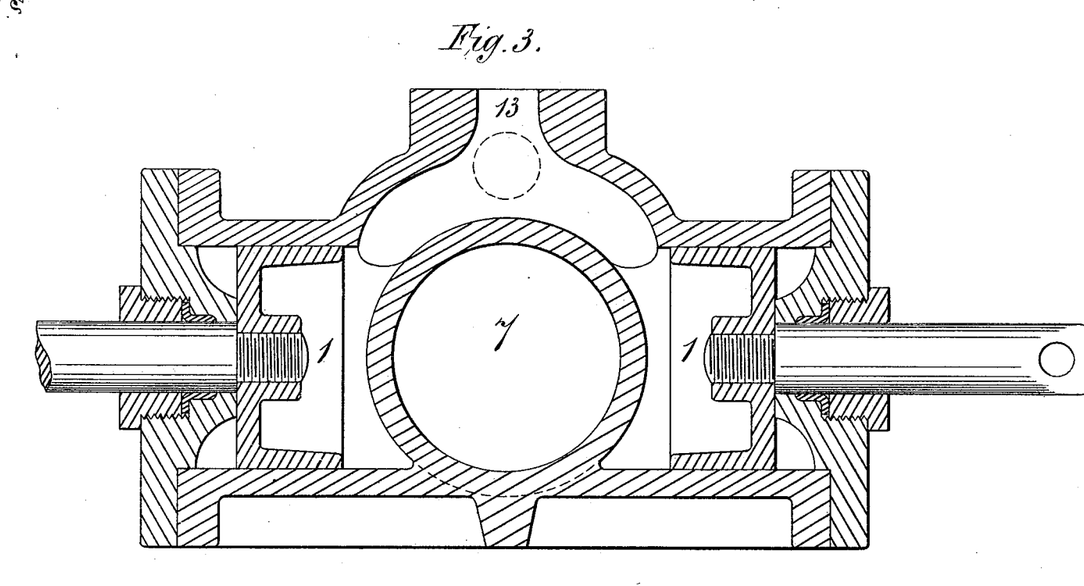
Fig. 3 is a horizontal longitudinal section through the brake-cylinders and accumulator on the line $x$ $y$, Fig. 2.
Figure 4:
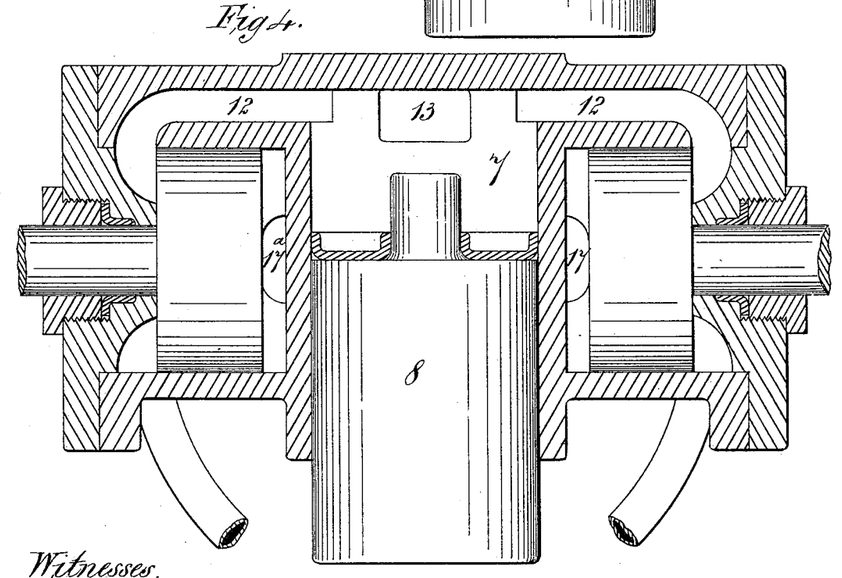
Fig. 4 is a corresponding vertical longitudinal section through the brake-cylinders and accumulator.

The inner or "off" side of each piston 1 is in constant free communication with the train-pipe by means of passages 17 and 17ª. Since the valve 14 is normally open the two sides of each piston 1 are normally in communication with one another, and the intensity of pressure per square inch is normally the same on both sides of each piston. The effective area on the off side being, however, larger than that of the on side to the extent of the sectional area of the attached piston-rod, the brake-blocks are, owing to this differential pressure, normally held off the wheels. On the other hand, when the pressure is reduced in the train-pipe, the valve 14 closes communication between the train-pipe and accumulator. While under these circumstances the pressure is maintained in the accumulator and outer or on side of each piston 1, the pressure is reduced on the inner or off side of each piston, which side still freely communicates with the train-pipe. As this reduction of pressure on the off side of each piston continues, while the pressure on the other or on side is maintained, the point is ultimately reached when the total pressures on the on sides exceed the total pressures on the off sides, whereupon the pistons will be forced inward and the brakes applied, as before explained. The further the pressure in the train-pipe is reduced the greater will be the pressure forcing the brake-blocks against the wheels. Upon again sufficiently increasing the pressure in the train-pipe the brake-blocks are released and the brakes cease to act, and when the pressure in the train-pipe again exceeds the pressure in the accumulator the valve 14 opens and the pressure in the accumulator increases correspondingly.

Figure 5:
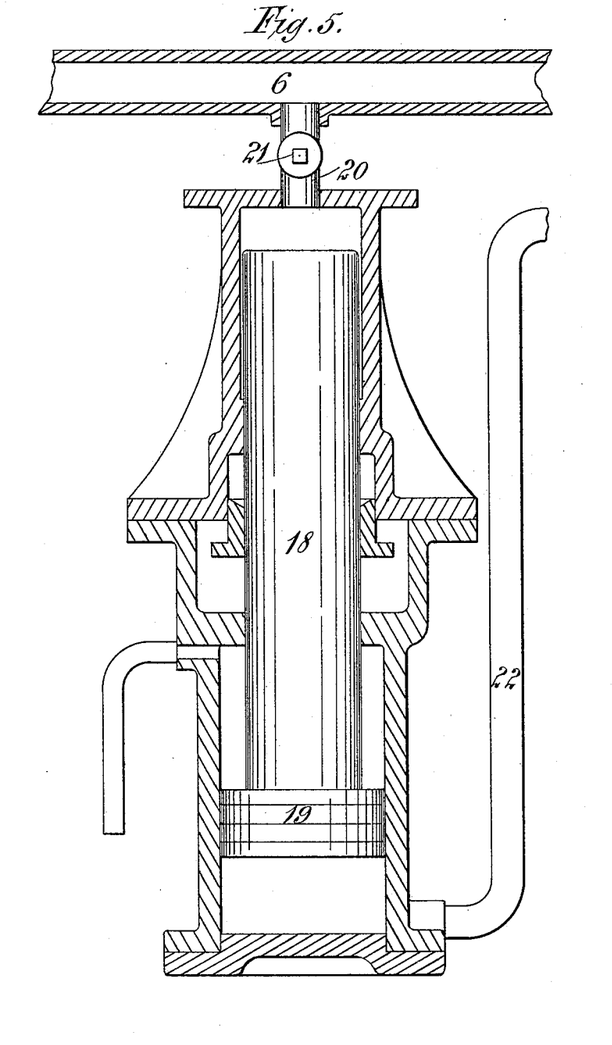
Fig. 5 is a longitudinal section through the intensifier.

In cases where the pressure in the boiler is not sufficient for actuating the brakes in an efficient manner, an intensifier of the form shown in Fig. 5 may be advantageously employed for the purpose of increasing the pressure in the train-pipe. This intensifier comprises two cylinders arranged in a common axial line, but of different diameters, containing a common plunger, 18, provided with a piston, 19, to fit the larger cylinder. The upper end of the smaller cylinder communicates by a pipe, 20, with the train-pipe 6, the said pipe 20 being preferably provided with a stop-cock, 21. The lower end of the larger cylinder communicates by means of the pipe 22 with the boiler, this pipe 22 being provided with a suitable shut-off valve. One or more intensifiers is or are placed on the engine or other vehicle on the train, preferably in a vertical position below the train-pipe, the plunger being, when not in operation, kept down by the combined action of its weight and the pressure in the train-pipe. When, however, the pressure from the boiler is communicated to the piston 19, of larger diameter, the plunger 18 is then forced up and, the cock 21 being open, additional pressure is put on the train-pipe and cylinders. Upon releasing the pressure from the intensifier, the pressure in the brake-pipe is reduced, and consequently the brakes are applied. The intensifiers do not form an essential and indispensable part of my improved brake apparatus, but may with advantage be applied to the same.

It will be readily understood that two distinct and similar valves might be employed for separately actuating the admission of the fluid to the train-pipe and intensifier, (leaking-valve 36 being omitted in the case of the intensifier;) but the present arrangement, which consists in casting in one the valve-chests of both valves, and thus combining the two valves, is an advantage, since both valves may be operated at the same time, and one pipe will suffice to supply liquid to both, as will hereinafter be seen.

Figure 6:
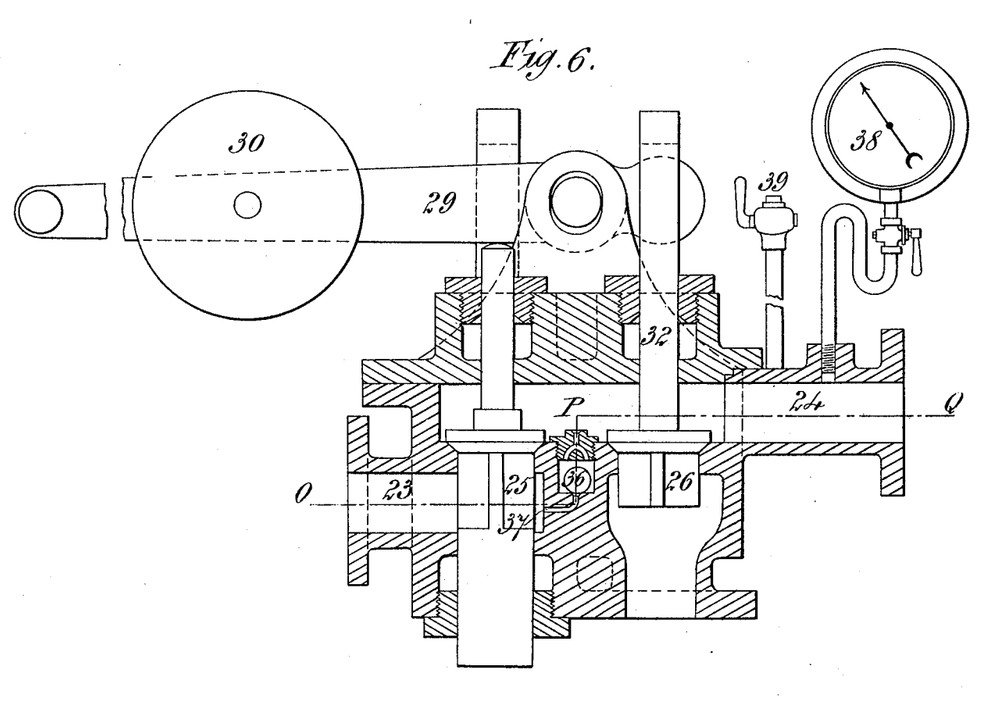
Figs. 6, 7, 8 are sectional views of a combined valve for controlling the admission of the actuating-fluid from the boiler to the train-pipe and intensifier.

Fig. 6 is a vertical section through the valve, which serves to control the admission of the liquid to the train-pipe. When a combined valve is used, serving both the train-pipe and intensifier, two sets of such valves are grouped together in one casting. The inlet 23 communicates with the boiler by means of a pipe provided with an ordinary stop-cock. The outlet 24 leads to the train-pipe 6, and communicates with the pipe 23 by way of a valve, 25, suitably guided and operated by means of the lever 29, which may be weighted at 30 by a weight or spring, so as to keep the valve 25 normally closed. 26 is a valve for discharging the liquid from the train-pipe, and is operated by the short end of the lever 29, which enters a slot formed in the valve-spindle 32. This valve is opened by pressing down the long end of the lever or handle 29, and is normally kept closed by the pressure of the liquid in the train-pipe acting on the upper surface of the valve 26. The valve for operating the intensifier is of similar construction. In this case the pipe 22, Fig. 5, which communicates to the lower end of the intensifier, is substituted for the pipe 24, communicating with the train-pipe.

Figures 7, 8, 9:
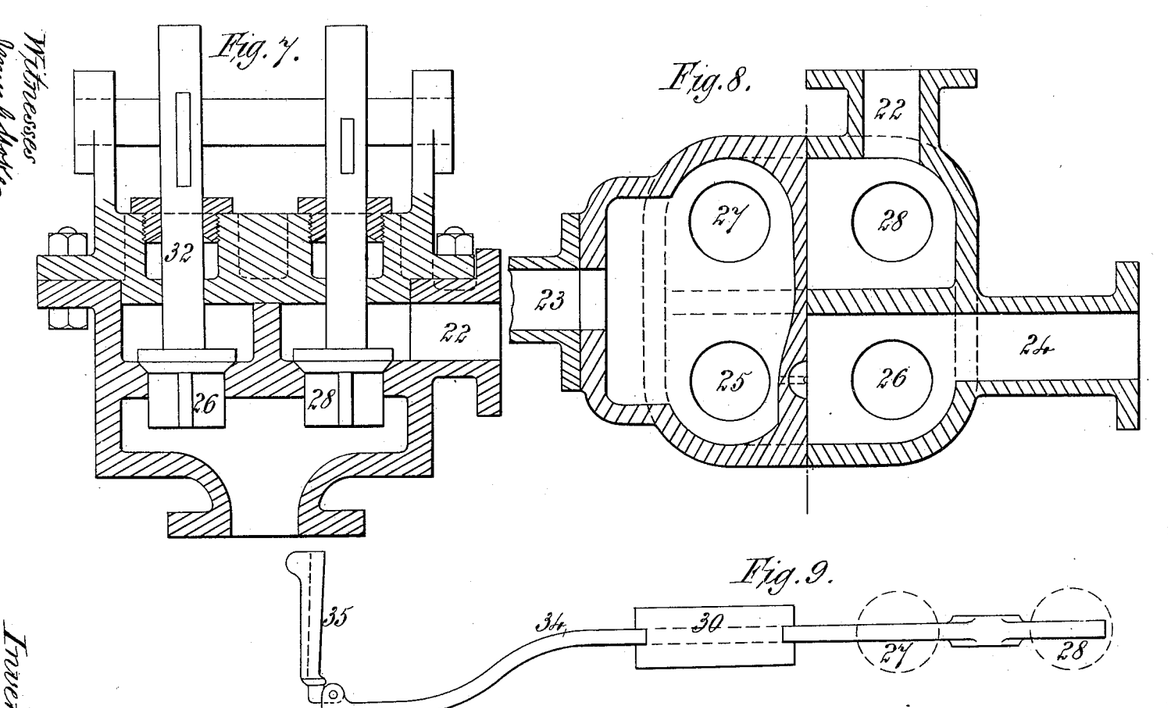
Figs. 9 and 10 show diagrammatically the manner in which the two operating-levers in the combined valve are connected.
Figure 10:
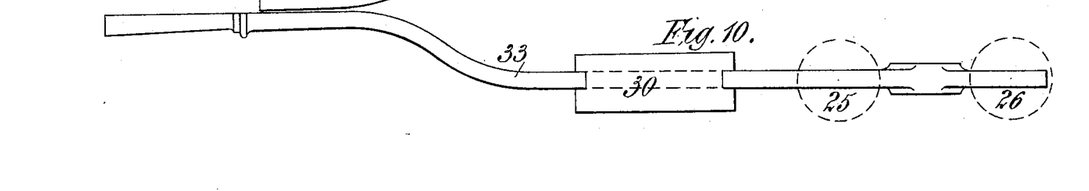
Figure 11:
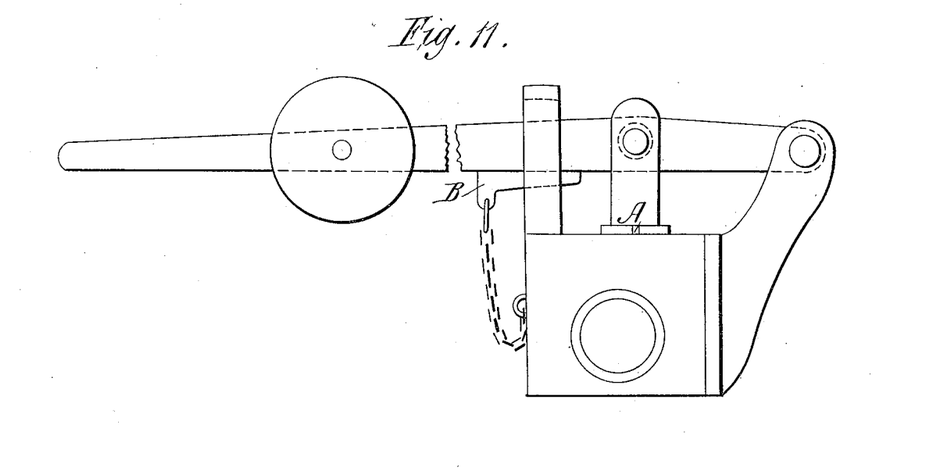
Fig. 11 is an automatic van-valve which opens automatically when the brakes are suddenly applied.
Figure 12:
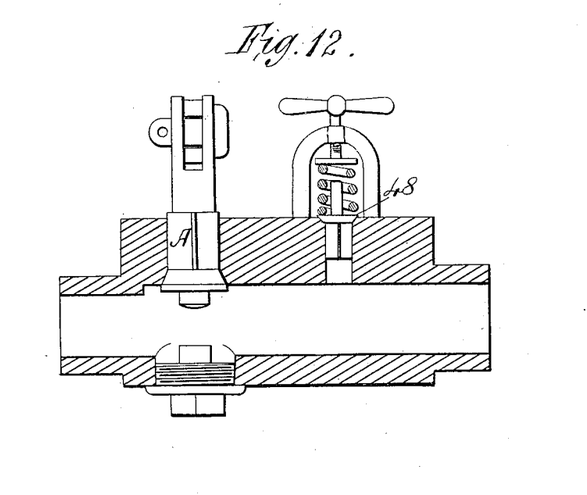
Fig. 12 shows a leak-valve designed to allow a slight continuous escape of liquid from the train-pipe.

Fig. 7 is a transverse vertical section of a combined valve, such as referred to above, taken through the discharge-valves of the brake-pipe and intensifier, respectively. Fig. 8 is a horizontal section through the same valve in the line O P Q, Fig. 6. The operating-levers of the two sets of valves are connected in the combined valve, as shown in Figs. 9 and 10, so as to render possible the manipulation of these valves by means of two handles connected together so as to form one when required. These handles may be provided with a quick-threaded screw, in order to facilitate their exact adjustment and regulation. Upon raising the handle 33 the valve 25 is first opened and the brake-pipe charged with pressure from the pipe 23, communicating with the boiler. If the said handles 33 and 34 be connected by means of clip-handle 35 and be lifted further, the valve 27 of the intensifier is opened. The intensifier is thus charged and the pressure in the train pipe increased, the valve 25 and leaking-valve 36 being consequently closed.

To release the pressure on the train-pipe, the handles 33 and 34 are pressed down, thus in the first instance opening the intensifier release-valve 28, which has a shorter slot in the spindle than the valve 26, which is unaffected. By still further pressing the handle 33 down the release-valve 26 is opened and the remaining pressure taken off the train-pipe. To apply the brake lightly, the pressure is, as gradually as may be desirable, let off the intensifier by opening the valve 28 until the piston is home. If it be then required to take off more pressure, the handle 33 is further pressed down, thus opening the exhaust-valve 26. For actuating the brakes by the ordinary pressure of the boiler without the aid of the intensifier, the clip-handle is disengaged, and the valves 25 and 26 are thus worked independently with handle 33; also, the intensifier-valves 27 and 28 may be worked by handle 34 independently of handle 33, when required. The discharge-pipe is led into the tender or tank, thus obviating any unnecessary loss of water. A narrow passage, 37, controlled by a ball-valve 36, may be arranged to maintain a communication between the pipe 23, leading to the boiler, and the branch 24, communicating with the train-pipe, for the purpose of allowing a leakage of liquid into the train-pipe, in order to maintain the pressure in the brake apparatus if there exists leaking of any kind, and also for the purpose of maintaining the temperature in the train-pipe above freezing-point.

Pressure-gages 38, connected with the train-pipe, may be applied in any suitable positions—as, for instance, on the engine and in the guards' compartments.

39 is an air-cock connected with the train-pipe.

The brake may be applied by the guard by placing a discharge cock or valve on the train-pipe in guard's compartment. The outlet may be arranged sufficiently high to allow of its being used as an air-cock when charging main pipe. When required an automatic van-valve box may be arranged as shown in Fig. 13, so that when the pressure is reduced in train-pipe the valve A (which opens inward) drops automatically and rings an alarm-bell to notify the fact of the brakes being applied to the attendant. This valve A must be closed before recharging the train-pipes with pressure, and may be kept shut by a wedge, as shown at B, when the pipes are being charged and removed at pleasure when on a journey by the attendant. One or more small valves (shown at 48 in Fig. 14) are connected to the train-pipe and placed in suitable parts of the train—as, for instance, in the guards' vans. The said valves allow a slight escape of liquid from the train-pipe and close automatically when the pressure has been reduced below a certain point. These valves can be regulated to the pressure required, and maintain a constant circulation of warm water from the boiler through the train-pipe. The liquid in the train-pipe can be thus maintained at a degree of temperature above the freezing-point. As is evident, these valves may be altogether closed when required—as, for instance, when there is no frost.

In order to render the operation of the brake clear, let it be supposed that a train of coupled vehicles has the pipes connected and the engine coupled up, the train-pipe being empty. The pipes are first filled through a cock from the tender, the air-cock 39, Fig. 6, being left open. The pressure must then be put on by raising the lever 33. By opening the cock 16 the pressure may be released from the brake-pipe, since the liquid is free to pass through the valve 14 and out through the cylinders and cock 16, thus not applying the brake to the vehicle upon which the valve 16 is opened, but putting it on all the other vehicles of the train. These cocks are also used for releasing the brakes from disconnected vehicles for the purpose of shunting, and may also be used for easing off the pressure on the brakes when required. If thought desirable, arrangements might easily be applied in order to enable passengers to open the cock 16 for the purpose of stopping the train; or a separate cock might be placed on the train-pipe to each vehicle, which cock may be worked by passengers, if necessary, for applying the brakes on the train. When required, vehicles may be supplied with one or more extra accumulators for storing water or other liquid under pressure. These accumulators may be charged and shut off from the brake-pipes with cocks. By this means a portion of a train may be cut off from the engine, and when the pressure in the small accumulators is exhausted the train-pipes and accumulators my be replenished from these separate stores, which, when not connected to an engine, may be recharged by a pump worked either by hand or from an axle of the vehicle. By this appliance a train might safely be allowed to run down a long incline without a locomotive.

What I claim is—

1. In an automatic hydraulic brake apparatus, the combination, with a locomotive or other boiler, of a train-pipe opening directly into said boiler and extending to one or more vehicles, one or more cylinders attached to each vehicle and provided with a piston or pistons, to which brake-levers are connected, and one or more accumulators attached to each vehicle, the whole combined and operating in substantially the manner set forth.

2. Automatic brake apparatus comprising a train-pipe connected directly to a boiler, a cylinder or cylinders fitted with differential piston or pistons or rams connected to the brake blocks or shoes, and an accumulator or accumulators, substantially as described.

3. In an automatic hydraulic brake apparatus, the combination, with a locomotive or other boiler, of a train-pipe opening directly into said boiler, a brake cylinder or cylinders, with piston or pistons 1, having an effective area larger on one side than on the other, piston rod or rods and brake-gear, such as 2 3 4 5, constructed, arranged, and operating substantially as described.

4. In hydraulic automatic brake apparatus, the combination of a locomotive or other boiler, a train-pipe to contain actuating-liquid under pressure opening directly into said boiler, brake-cylinders containing differential pistons, a passage, 17, that places the inner sides of the pistons in constant communication with said train-pipe, and an accumulator to contain liquid under pressure, the interior of said accumulator being placed on the one hand in free communication with the outer sides of said pistons by a passage, 12, and on the other hand with said train-pipe by a passage, 13, controlled by a valve, 14, substantially as described, for the purpose specified.

5. In hydraulic automatic brake apparatus, the combination of a locomotive or other boiler, a train-pipe opening directly into said boiler, an accumulator or accumulators, cylinders containing pistons connected to suitable brake-gear, and one or more pressure-intensifiers, comprising two plungers or rams of unequal diameters, operated by fluid under pressure, substantially in the manner described, and for the purpose specified.

6. In hydraulic brake apparatus, the combination, with a locomotive or other boiler, of a train-pipe opening directly into said boiler and a pressure intensifier or intensifiers provided with suitable connections and valves for the purpose of increasing the pressure in said train-pipe, substantially as described.

7. In hydraulic automatic brake apparatus, the combination, with a locomotive or other boiler, of a train-pipe opening directly into said boiler and a valve for controlling the admission and discharge of liquid under pressure to or from said train-pipe or intensifier, said valve comprising passages 23 and 24, an admission-valve, 25, a discharge-valve, 26, and a lever, 29, all constructed, arranged, and operating as hereinbefore described, for the purpose specified.

8. In hydraulic brake apparatus, the combination, with a train-pipe and intensifier, of a combined valve or device for controlling the admission and discharge of liquid under pressure to or from said train-pipe and intensifier, comprising a combination of two valves—namely, an admission-valve and a discharge-valve—and a single operating-handle, 33, whereby both valves are controlled, substantially as described, and for the purpose specified.

9. In hydraulic automatic brake apparatus, the combination of a locomotive or other boiler, a train-pipe, a valve for controlling the admission to and discharge from said train-pipe of liquid under pressure derived from said boiler, a narrow passage, 37, a ball-valve, 36, to control said passage, and an adjustable leak-valve, 48, for the purpose of allowing a slight continuous escape of liquid from the train-pipe when desirable, substantially in the manner described, for the purpose specified.

10. In hydraulic automatic brake apparatus, the combination, with a train-pipe, of an automatic van-valve that will open automatically when a sudden diminution of pressure in said train-pipe occurs, said automatic valve comprising an ordinary check-valve opening toward the train-pipe and connected directly with a weighted lever, constructed, arranged, and operating substantially as described.

RICHARD HERBERT LAPAGE.

Witnesses:
 HUGH HUGHES,
 EDWARD NORTON HOBBS.